United States Patent
Vering et al.

(10) Patent No.: US 7,222,369 B2
(45) Date of Patent: May 22, 2007

(54) ROLE-BASED PORTAL TO A WORKPLACE SYSTEM

(75) Inventors: Matthias Vering, Bad Schoenborn (DE); Peter Barth, Hockenheim (DE); Sven Schwerin-Wenzel, Dielheim (DE); Thomas Anton, Schwetzingen (DE); Peter Bittner, Hockenheim (DE)

(73) Assignee: SAP AG, Walldorf (DE)

( * ) Notice: Subject to any disclaimer, the term of this patent is extended or adjusted under 35 U.S.C. 154(b) by 257 days.

(21) Appl. No.: 10/306,894

(22) Filed: Nov. 27, 2002

(65) Prior Publication Data

US 2004/0019799 A1 Jan. 29, 2004

Related U.S. Application Data

(60) Provisional application No. 60/343,285, filed on Dec. 20, 2001.

(51) Int. Cl.
*G06F 12/14* (2006.01)
(52) U.S. Cl. .................. 726/28; 726/27; 715/743; 715/740; 711/163; 709/226
(58) Field of Classification Search ............... 715/744, 715/743, 741, 707, 967; 711/163; 707/9; 713/182, 185
See application file for complete search history.

(56) References Cited

U.S. PATENT DOCUMENTS 6,781,607 B1 * 8/2004 Benham ............... 715/744

2002/0178270 A1 * 11/2002 Riordan ................ 709/229

FOREIGN PATENT DOCUMENTS

FR 2802674 A1 * 6/2001
WO WO 0133431 A1 * 5/2001

OTHER PUBLICATIONS

Na, et al., "Role Delegation in Role-Based Access Control", *Proceedings of the 5th ACM Workshop on Role-Based Access Control*, Berlin, Germany, Jul. 26-27, 2000; *Role-Based Access Control Workshop*, New York, NY, pp. 39-44, Jul. 26, 2000.

(Continued)

*Primary Examiner*—B. James Peikari
(74) *Attorney, Agent, or Firm*—Mintz Levin Cohn Ferris Glovsky & Popeo P.C.

(57) ABSTRACT

A method includes storing a plurality of role data entries on a storage device coupled to a computer system, each role data entry corresponding to an assigned role of at least one of a plurality of individuals, each role corresponding to an enterprise with which the individual is associated and corresponding to a set of resources accessible through the computer system, receiving at the computer a resource request from one of the individuals, determining whether the requested resource is included in the set of accessible resources corresponding to the assigned role of the requesting individual, and selectively permitting access to the requested resource if the resource is determined to be in the set of resources corresponding to the assigned role of the requesting individual.

32 Claims, 3 Drawing Sheets

OTHER PUBLICATIONS

Moffett, et al., "The uses of role hierarchies in access control", *Proceedings of the Fourth ACM Workshop on Role-Based Access Control, Proceedings of RBAC '99: Fourth ACM Workshop on Role-Based Access Control*, Fairfax, Virginia, USA, Oct. 28-29, 1999, pp. 153-160.

Sybase, Inc., "Enterprise Portal—Overview and User Guide" *Sybase Enterprise Portal Version 1.0 Documentation*, Online!, May, 2000, pp. I-xii, 1-96, retrieved from the internet: http://download.sybase.com/pdfdocs/epg0100e/ep_intro.pdf, retrieved on Aug. 30, 2001.

Ferraiolo, et al., "Specifying and managing role-based access control within a corporate intranet", *Proceedings of the Second ACM Workshop on Role-Based Access Control*, Fairfax, Virginia, USA, pp. 77-82, Nov. 6-7, 1997.

McNutt, "Role-Based System Administrationor Who, What, Where, and How", *Proceedings of the Systems Administration Conference*, Monterey, California, USA, LISA, 1993, pp. 107-112, Nov. 1-5, 1993.

Thomsen, et al., "Role Based Access Control Framework for Network Enterprises", *Proceedings 14th Annual Computer Security Applications Conference*, (CAT No. 98EX217), Phoenix, Arizona, USA, pp. 50-58, Dec. 7-11, 1998.

Donthy, "Coordinator: A Java Based Manufacturing Application", *Case Study (Satheesh A. Donthy Home Page)* Jan. 10, 2000, retrieved from the internet http://members.tripod.com/sdonthy/case-study.html; retrieved on Aug. 30, 2001.

\* cited by examiner

FIG. 2

ROLE-BASED PORTAL TO A WORKPLACE SYSTEM

CLAIM OF PRIORITY

This application claims priority under 35 USC §119(e) to U.S. patent application Ser. No. 60/343,285, filed on Dec. 20, 2001, the contents of which are incorporated by reference.

BACKGROUND

The following description relates to a role-based portal to a workplace system.

Individuals typically produce goods in specialized workplaces, i.e., a weaver's workplace is different than a blacksmith's, which, in turn, is different than a boat builder's. However, there are usually some similarities among workplaces. For example, many workplaces include a place to store materials, tools and records about their use of materials, and/or goods produced. The increased use of computer technology by contemporary businesses has altered the conventional definition of "workplace" for many individuals.

SUMMARY

According to an aspect of this invention, a method includes storing a plurality of role data entries on a storage device coupled to a computer system, each role data entry corresponding to an assigned role of at least one of a plurality of individuals, each role corresponding to an enterprise with which the individual is associated and corresponding to a set of resources accessible through the computer system, receiving at the computer a resource request from one of the individuals, determining whether the requested resource is included in the set of accessible resources corresponding to the assigned role of the requesting individual, and selectively permitting access to the requested resource if the resource is determined to be in the set of resources corresponding to the assigned role of the requesting individual.

One or more of the following features may also be included: The method may include the item of information corresponding to at least one of an item of information that is displayable on a window of a display device, an application executable on a user device, and an address link to information stored on a second computer. The method may further include storing at least one item of the accessible information on the storage device coupled to the computer. The method may include at least one item of the accessible information corresponding to a link address, the link address corresponding to an item of information stored on a second computer. The method may further include displaying the requested item of information on a display window of a user device. The method may further include detecting a selection of an active region on the window prior to sending a request for the item of information, wherein the request corresponds to the detected selection. The method may further include displaying the requested item of information on the display window. The method may further include displaying the requested item of information on an associated window on the display device. The method may further include relating a first object displayed on the window to a second object displayed on the window, wherein relating the first object to the second object causes a further display of information on the window. The method may include at least one of the first object and second object being icons displayable on a display device of a computer. The method may further include assigning a common set of information to a plurality of assigned roles, each role corresponding to at least one individual. The method may further include detecting a change to an item in the common set of information, and sending a message to at least one of the other plurality of individuals to indicate the detected change. The method may further include displaying an up-dated display window that reflects the detected change to the item of information. The method may include controlling access to the common set of information by a first individual assigned a controlling role. The method may further include accessing the set of information from a plurality of user devices, each user device having a role-based portal window. The method of displaying the window may include executing a browser application, the browser application controlling a role-based portal window displayable on the user device. The method of accessing the subset of information may include displaying a customized display window including at least one item of the subset of information accessible to the individual. The method may include having the customized display window corresponds to a previously customized display window. The method may further include accessing the information by logging on to the system with a unique identifier corresponding to a one of the plurality of individuals. The method of logging on to the system may include executing a single sign on application. The method may further include controlling access by the plurality of individuals to the common set of information by a first individual. The method may include having the first individual having access control to the common set of information is an employee of a business, and a second one of the plurality of individuals is a non-employee.

According to a further aspect of this invention a system includes a first computer coupled to a storage device, the storage device holding a plurality of role data entries, each role data entry corresponding to an assigned role of at least one of a plurality of individuals, each role corresponding to a subset of information accessible through the first computer, a user device coupled to communicate with the first computer, the user device having a display device displaying a role-based portal window, the role-based portal window usable to send a request to the first computer for an item of information, and a role-based filter application executable by the first computer to determine whether the item of information requested is included in the subset of accessible information corresponding to the assigned role of the requesting individual, the role-based filter application to determine if that item of information is included in the subset of information corresponding to the assigned role of the requesting individual.

One or more of the following features may also be included: The system may further include a second computer coupled to communicate with the first computer and the user device, wherein at least one item of the accessible information corresponds to a link address, the link address corresponding to an item of information stored on the second computer. The system may include having a common set of information assigned to a plurality of assigned roles, each role corresponding to at least one individual, the role-based filter application executable to detect a change to an item in the common set of information by a first one of the plurality of individuals and send a message to at least one user device corresponding to a second of the plurality of individuals to indicate the detected change.

According to a further aspect of this invention a method of facilitating access to resources in a collaborative environment, the method including receiving a request from a user to access a resource associated with the collaborative environment, determining the requesting user's enterprise affiliation, and selectively providing access to the requested resource based on the determination of the requesting users enterprise affiliation.

One or more of the following features may also be included: The method may include having the resource being at least one of a tool, application, file, file link and document. The method may further include displaying the requested resource on a display window of a user device. The method may further include assigning a common set of resources to a plurality of assigned roles, each role corresponding to at least one individual. The method may further include controlling access to the common set of resources by a first individual assigned a controlling role. The method may further include accessing the set of resources from a plurality of user devices, each user device having a role-based portal window. The method may include having the first individual having access control to the common set of resources is an employee of a business, and a second one of the plurality of individuals is a non-employee.

Using a workplace system, and limiting access to tools/information through role-based portals provides several advantages. For example, the productivity of an individual may be increased by limiting the set of accessible tools and information to those considered most relevant for completion of a role. The efficient use of the resources of the workplace system may be increased, for example, by allowing multiple individuals to perform different roles where each individual may have access to different tools and/or information based upon their assigned role(s). The security may be increased since individuals are selectively allowed limited access to the tools and information on the system. Finally, the time required to update tools and information may be reduced and the process simplified, e.g., an update need only be made to a single tools/information file 14 and not to multiple files which may be stored on disparate systems.

The details if one or more embodiments are set forth in the accompanying drawings and the description below. Other features and advantages will be apparent from the description below. Other features and advantages will be apparent from the description and drawings, and from the claims.

DESCRIPTION OF THE DRAWINGS

FIG. 2 is a diagram of a role-based portal window.

DESCRIPTION

Figure 1:
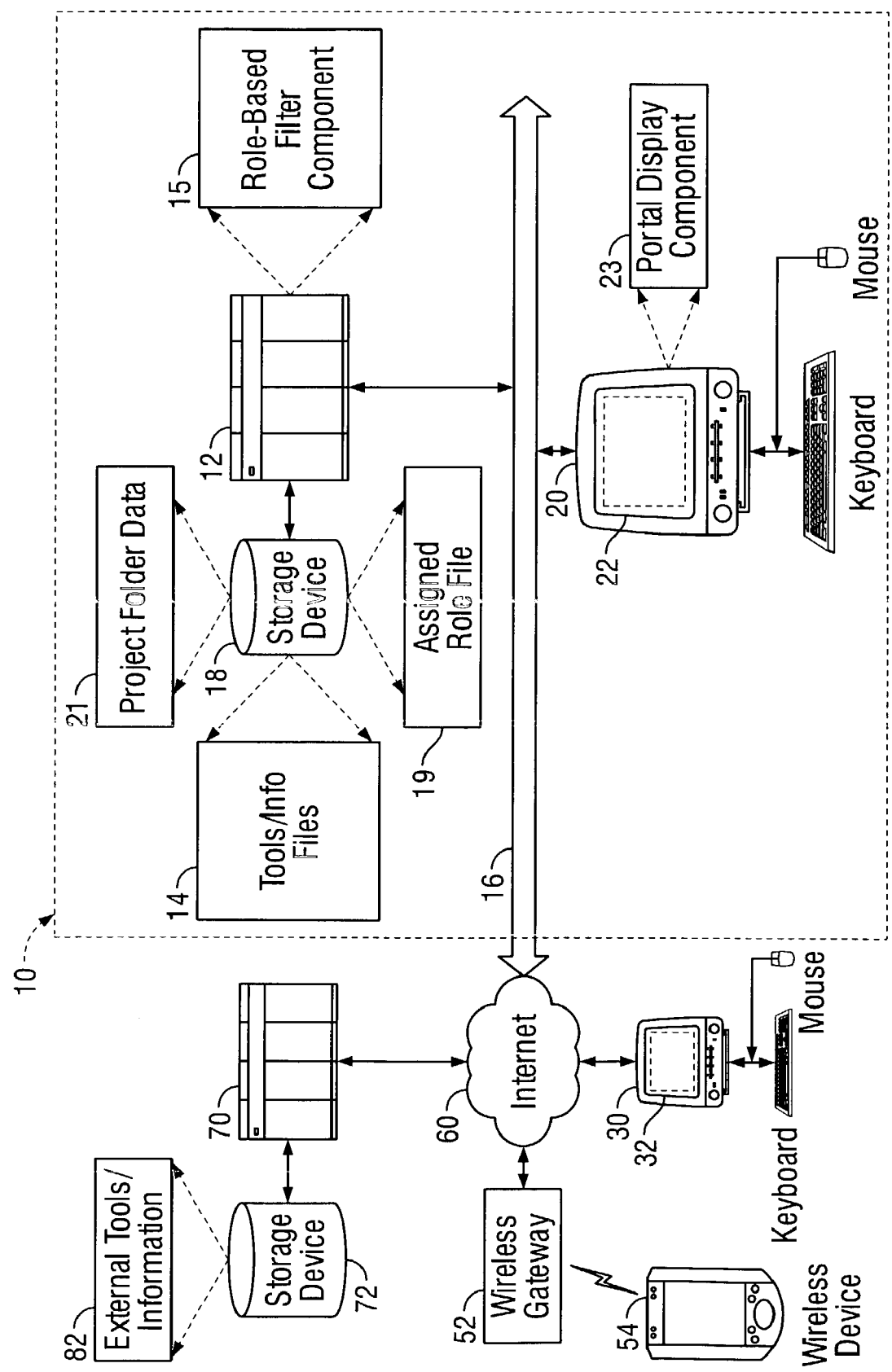
FIG. 1 is a block diagram of a workplace system.

Referring to FIG. 1, a workplace system 10 includes a server computer 12 and a personal computer 20 coupled to communicate with each other on a network link 16. Server computer 12 is coupled to a data storage device 18 used to store resources such as tools and information files 14, project folder data 21, and assigned role files 19. A resource is any tool, application, file, document or other item of information to be accessed. A resource is any tool, application, file, document or other item of information to be accessed. In this example, "tools" refers to applications that may be executed on a user device, such as personal computer 20, and "information" refers to data that may be displayed as text or images, e.g., on a role-based portal window 22 of a display device. An assigned role file 19 includes a plurality of data entries, each entry including data that represents information for an assigned role and/or an identity of an individual assigned to that role. In operation, an individual interacts with a role-based portal window 22 on user device 20 to request access to specific tools and/or information from the tools and information file 14 on the server computer 12. A role-based filter component 15 (e.g., an executable application on server computer 12) uses data from assigned role data file 19 to determine whether the specific tools and/or information requested may be accessed by a particular individual based upon his/her identity and assigned role(s). If access is granted, those tools and/or information determined accessible may be retrieved by the individual on user device 20, and displayed and/or executed on their role-based portal window 22.

"Portal" generally refers to a starting point for a individual to gain access to tools and/or information from file 14 on workplace system 10. A portal display component 23 executed on the user device 20 can be used to control the role-based portal window 22. In an implementation, the role-based portal window 22 is implemented as a browser application executing on a user device that, when initially launched, displays a "home page" window that provides the user with easy access to a collection of various tools and resources.

"Role-based" refers to selectively granting limited access to tools and/or information from file 14 based upon an assigned role(s) of an individual. In more detail, in order for an individual to fulfill a role, he or she must undertake and perform specific activities and tasks. An individual's role(s) is not necessarily synonymous with a job description. For example, an employee of a business may fulfill more than one role within the business organization, e.g., the individual may be assigned to multiple roles at the same time, for example, a role of a design engineer on a first project and a role of project manager on a second project. Therefore, the tools and information needed to perform tasks may differ according to each assigned role. Using workplace system 10, and limiting access to tools/information through role-based portals provides several advantages. For example, the productivity of an individual may be increased by limiting the set of accessible tools and information to those considered most relevant for completion of a role. The efficient use of the resources of workplace system 10 may be increased, for example, by allowing multiple individuals to perform different roles where each individual may have access to different tools and/or information based upon their assigned role(s). The security may be increased since individuals are selectively allowed limited access to the tools and information on system 10. Finally, the time required to update tools and information may be reduced and the process simplified, e.g., an update need only be made to a single tools/information file 14 and not to multiple files which may be stored on disparate systems.

Workplace system 10 may be coupled to Internet 60. Internet 60 is an example of a "wide area network" (WAN), i.e., a network of inter-connected computers that may communicate with one another, for example, transmitting data, messages and application information to one another. In this example, an external server computer 70 and a second personal computer 30 are coupled to Internet 60. External server computer 70 is coupled to a storage device 72 that is used to store external tools/information files 82. Therefore, in this implementation, the tools/information accessible to an individual through a role-based portal may include "internal", or local, tools and information 14 (e.g., tools/information stored on storage device 18) and may also include "external", or remote, tools and information 82 (e.g., tools/information 82 stored on storage device 72). The personal computer 30 also may be used to execute the portal display component 23, e.g., usable by an individual to display a role-based portal window on window 32 and to request tools/information from role-based filter component 15.

"Tools" may refer to an available service from an internal or external computer system, for example, a tool may refer to a payroll service, a benefits management service, a billing service, etc. As a further example, an individual whose assigned role includes shipping packages might have access to a courier company's service on Internet 60. The courier company service may allow the individual to execute and interact with an application that allows scheduling pickup and/or delivery of a package, and may also allow the individual to acquire information about where the package is, package volume shipped, and/or package volume delivered to a customer, etc. If the assigned responsibilities of an individual role include making travel reservations, his or her role-based portal may, for example, have access to a travel service (e.g., an application) provided by a travel management service through Internet 60. The travel service may allow the employee to execute and interact with an application that provides information about prices, travel times, and routes, for example. In response to inputs/selections made by the individual, the travel management service may process tickets, deliver them (or confirm for e-ticketing), provide travel summary information for individuals, groups, offices, etc.

Role-based filter component 15 may include instructions that when executed by server computer 12 determine available tools/information 14 based on an industrial category corresponding to a role. For example, a purchasing manager for a chemical company may be granted access to tools/information related to the chemical industry but not given access to tools/information related to the auto industry. Role-based filter component 15, therefore, may reduce and/or focus the type of information that is accessible on a role-based portal based upon an industrial category.

The role-based portal window 22 may be implemented as a browser application having "drag and relate" capability such as described in U.S. Pat. No. 5,848,424, which is incorporated by reference. Drag and relate refers to relating a first object (e.g., a first icon) to a second object (e.g., a second icon) by dragging the first icon onto the second object. For example, on a role-based portal window for a project manager, a first icon may be presented that represents a design engineer assigned to a project, and a second icon may be presented that represents a travel service. The project manager may "drag" the design engineer icon onto the travel service icon, which will cause a display of data corresponding to the design engineer's use of the travel service.

An entity such as a business or a single individual may control access to workplace system 10. For example, the entity may have sole control of the content and access to files stored on storage device 18. Access to workplace system 10 may be granted both to employees and non-employees of a business using role-based portals to establish a "collaborative workplace". Collaborative workplace refers to an environment that may be used, for example, by both employees and non-employees to perform tasks related to a common product or process. The collaborative workplace may reduce the cost of product development, e.g., by reducing the time and complexity of transferring information between multiple collaborators. Training costs may be reduced by providing a relatively easy to use communications interface, that is, collaborators would not need to know how to use a host of different systems to access tools/information file 14, or to communicate with other collaborators. The collaborative workplace may also reduce the cost of travel especially on projects where a relatively large amount of interaction is required between project participants.

In some cases, the tools and information that are available to a project may be selectively available to each project participants based on a number of factors, for example, based on an assigned role(s) and whether or not the participant is an employee of the entity controlling the collaborative workplace.

The following describes an exemplary use of a collaborative workplace that includes the use of role-based portals. In this example, assume that a manufacturer (a "business") of anti-lock brake systems (ABS) has been awarded a contract from a client business to design a brake system for a new automobile. A project manager (e.g., an employee of the business controlling workplace system 10) is assigned a management role on the ABS project. Collaborating participants ("project participants") on the ABS project include the project manager, the client business and three design engineers ("collaborating engineers"). The three design engineers are from three other companies ("business partner companies"). Each business partner company is are developing a sub-assembly for the ABS project. Therefore, a data entry corresponding to the assigned role(s) of each project participant is stored in assigned role file 19.

Figure 2:
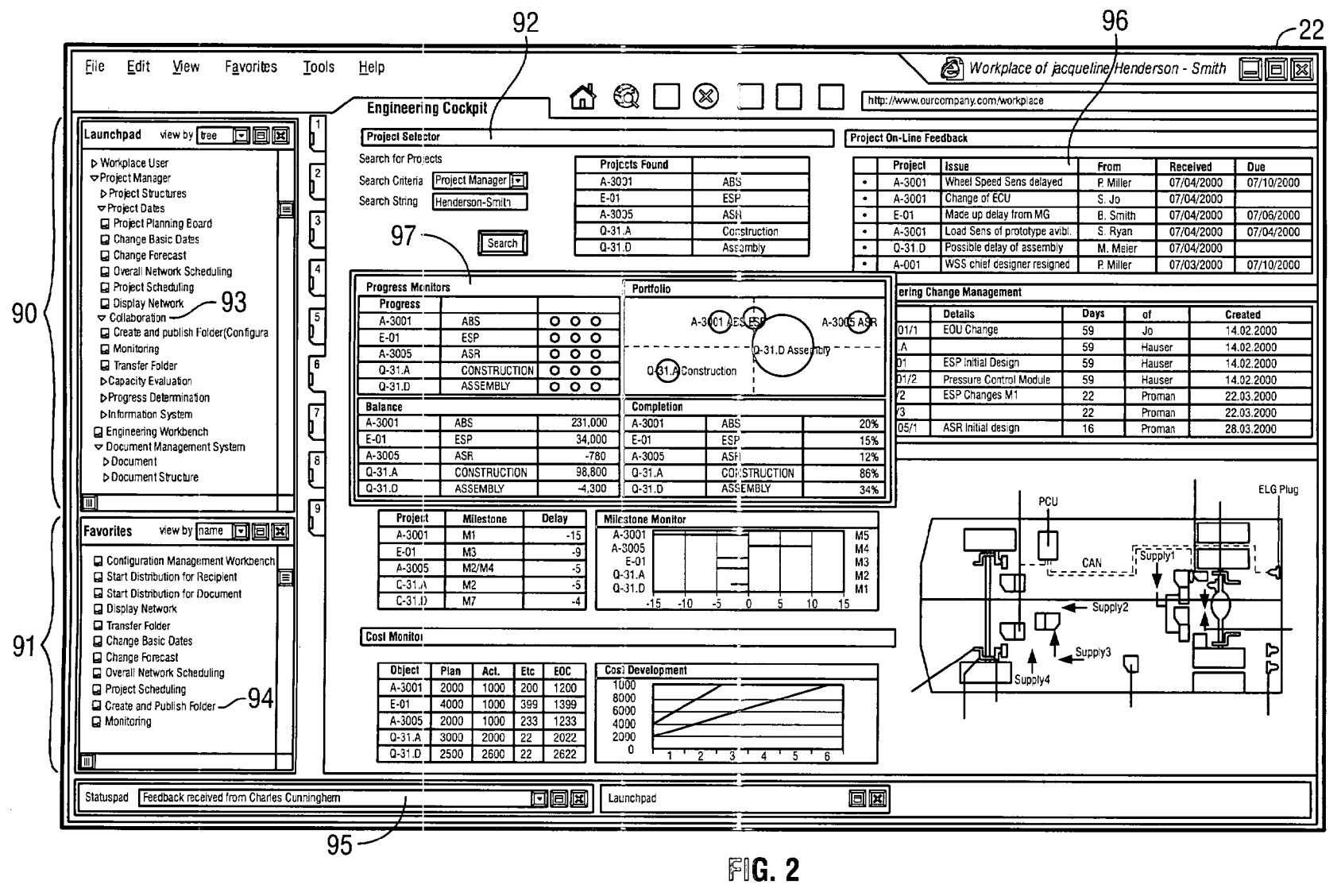

FIG. 2 illustrates an exemplary role-based portal window 22 displayed on a user device of a project manager. Role-based portal window 22 includes launching areas 90 and 91 that the project manager may use to access tools and/or information. Window 22 includes a "project selector" display area 92 displaying a variety of project tracking information. On his role-based portal window 22, the project manager may create a project folder (not shown) by selecting a collaboration option 93 of launching area 25. The project folder is used to hold and display relevant product information, for example, a parts list(s), a computer aided design (CAD) model(s) for sub-assemblies, an overall project plan, and a client's specification document(s). Data placed in the project folder by the project manager may be stored as project folder file 21 on storage device 18. Data stored in project folder file 21 is made selectively accessible to the collaborating engineers through their own role-based portals. Different project participants may have access to different subsets of the data depending on role, security level, company affiliation and the like.

The project manager may select an active area 94 to "publish" the project folder to the other project participants, for example, by sending an e-mail to one or more of the project participants confirming their participation in the client ABS project and outlining the process for communicating with one another. The e-mail may include a link to the project folder where the project information may be accessed (e.g., stored). The link may be a link to a web-site associated with workplace system 10 that includes information in project folder file 21. Project participants may use a browser application (e.g., portal display component 23) to request access to the information stored in project folder file 21 through their role-based portal(s) and role-based filter component 15, e.g., to access project information selectively based on their assigned role(s).

The project manager may create a proposal for the ABS system by using an engineering application such as a CAD (computer-aided design) system and may send the proposal to the collaborating engineers. One or more of the collaborating engineers may modify the proposal to conform the design to accomodate a particular component for which they are responsible. Modifications made by the engineers may be sent to the project folder file 21 and, thus made available to the other collaborating engineers and to the project manager. Because all collaborating parties can view the same design documents, meetings can be held "online" to discuss design issues.

The project manager's role-based portal may include tool(s) to track project progress (a "project selector" application), or review and compare work submitted by a project participant. For example, the project manager's role-based window 22 may include a status inbox 95 to display incoming messages, and/or a due date display area 96 to track due dates on the projects assigned to him/her. Using the project selector window 92, the project manager may select a display that provides an overview of all projects assigned to him/her, for example by displaying a "project monitor" area 97. Project monitor area 97 may show status, cost, and milestone tracking, for example. Portal display component 23 may include drag-and-relate capabilities. In this case, the project manager may interact with displayed icons to cause project details (e.g., corresponding to changes made by a party collaborating on a project) to be displayed on portal window 22.

The role-based portal of each collaborating participant provides a way of accessing project information. A change that affects project information may be used to trigger an "event", for example, an event may cause server computer 12 to send updated or changed information to one or more project participants. Therefore, each event may be used to coordinate a flow of information between the project participants. This way of coordinating the flow of information between participants may allow for faster response to changes and/or more accurate planning, which may reduce costs and/or improve service to the client business.

As described above, a role-based portal window for each project participant may display a common set of information, for example, information from project folder file 21. Each project participant may customize the tools and/or information displayed on their own role-based portal window. "Customize" refers to the ability of an individual to change the presentation and/or content of tools/information in his or her role-based portal window. For example, the portal window may include an active area(s) that the individual may select (or use to input data) to cause a change to how the portal window displays tools/information.

Each role, e.g., each entry in assigned role data file 19, is linked to a set of tools and/or information that is considered helpful to an individual assigned to the activities associated with that role. A role may be assigned for a finite duration, e.g., set to expire at a specific time/date.

As described above, tools and information accessible to an individual may be stored internally or externally to system 10. In some cases, tools and information file 14 may include links to storage locations elsewhere on system 10, or on an external computer system. Therefore, system 10 allows an individual to request tools and/or information from a single source, e.g., system 10, rather than having to request tools and/or information from the various systems where they actually are stored. In this case, the individual is presented with a single unified package of available tools/information through a role-base portal that is associated with his/her assigned role. Moreover, when a tool or information is moved from a first computer (or a first storage device) to another computer (or another storage device), server computer 12 may update the links associated with the tools/information that are affected by the move, therefore, the individual does not need to deal with the affected tool/information.

In an implementation of system 10, a role administrator is given authority to assign roles, and/or make changes to the tools/information associated with a role. In this case, individuals other than the role administrator cannot change an assigned role and thereby access restricted tools and/or information.

An individual may log on to workplace system 10 by using "Single Sign-on" (SSO) software. Using SSO, an individual needs to log on only once to workplace system 10 to access tools/information 14. SSO software may also provide authentication of messages sent between a individual's role-based portal and server computer 12.

An individual's access to workplace system 10 typically is not limited to using personal computer 20. For example, an individual may use a wireless device 54 coupled to communicate with server computer 12 through a wireless gateway 52 coupled to Internet 60. As another example, an individual may use a personal computer 30 coupled to communicate with server computer 12 through Internet 60. An individual assigned a role in assigned role data file 19 may access tools/information from tools/information file 14 by using a device having Internet access and capable of running a browser application.

Figure 3:
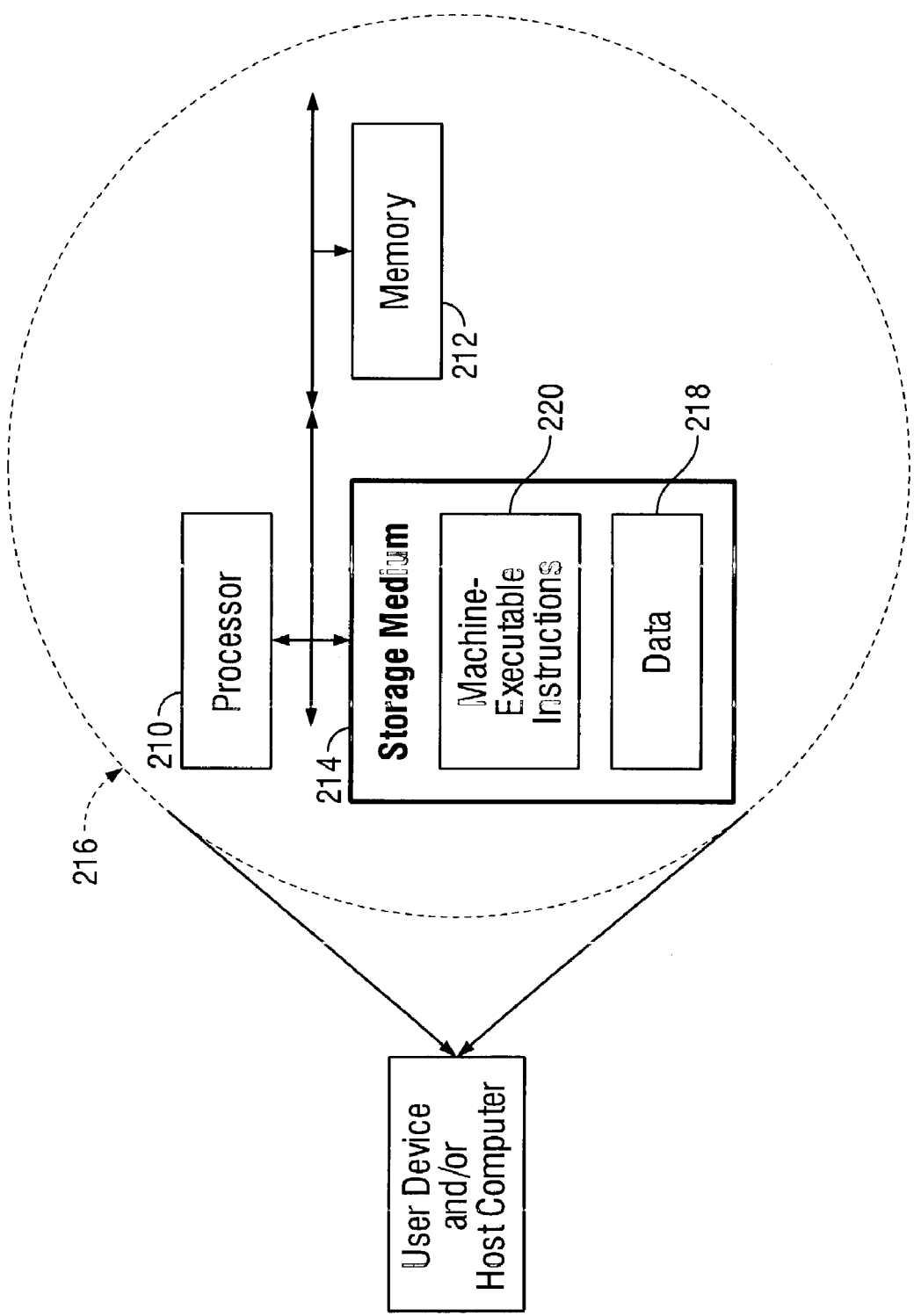
FIG. 3 is a block diagram of computer hardware on which processes corresponding to FIGS. 1 and 2 may be implemented.

Referring to FIG. 3, user devices 20, 30 and 54, and/or server computer 12 in system 10 may include a processor 210, a memory 212, and a storage medium 214 (see view 216). Storage medium 214 stores data 218 for description documents and also stores machine-executable instructions 220 that are executed by processor 210 out of memory 212 to perform user device functions (for example, process 100), and/or host computer functions (for example, host process 200). Furthermore, each user device and host computer may include an operating system.

User devices and/or the host computer need not be limited to use with the hardware and software of FIG. 3. They may find applicability in any computing or processing environment. They may be implemented in hardware, software, or a combination of the two. They may be implemented in computer programs executing on programmable computers or other machines that each include a processor, a storage medium readable by the processor (including volatile and non-volatile memory and/or storage components), at least one input device, and one or more output devices. Program code may be applied to data entered using an input device (e.g., a mouse or keyboard) to perform applications and to generate output information.

Each computer program may be stored on a storage medium/article (e.g., CD-ROM, hard disk, or magnetic diskette) that is readable by a general or special purpose programmable computer for configuring and operating the computer when the storage medium or device is read by the computer to perform applications.

As used herein, the term "computer system" refers to a physical machine having one or more processing elements and one or more storage elements in communication with the one or more of the processing elements. Each of the various user devices and computers described herein include an operating system. The operating system is software that controls the computer system's operation and the allocation of resources. The term "process" or "program" refers to software, for example an application program that may be executed on a computer system. The application program is the set of executable instructions that performs a task desired by the user, using computer resources made available through the operating system.

A user may interact with a personal computer or wireless device (a "user device") to send and receive messages and data from a computer network. Typically the user device includes a visual display device for displaying text and images, and a graphical user interface (GUI) to allow the user to interact with an operating system running on the user device. Many GUI's cause the display of a "desktop" on the display device, i.e., where the desktop refers to a graphical work surface analogous to a surface of a desk. Typically the desktop displays icons representing programs, files and resources available to the user. As such, the desktop acts as a launching point for running application programs, opening documents or files, displaying menus, and initiating operating system services.

The GUI may also use a windowing environment that presents the user with specially delineated areas called windows on the display device, each of which is dedicated to a particular application program, file or document. Windows that overlay the desktop in the GUI are analogous to papers or files laying on top of the desk. Typically, the windows may be re-sized, moved around on the display, and stacked so as to overlay other windows. The windowing environment may also allow windows to be increased to a full-screen display or minimized, meaning the window is reduced to and denoted by an icon.

A typical display window includes one or more "active" regions or icons. The active regions are associated with instructions to be executed upon the occurrence of an action by the user to select the active region (e.g., a mouse "click" on an active area). For example, instructions associated with an active region may cause a jump to a specified location upon the occurrence of a mouse-click within the active region. Other events can also cause the execution of instructions. In particular, a detected movement of a mouse and/or an entry of a mouse pointer into an active region (in either case, with or without a click of a mouse button) are also events that may be used to trigger the execution of instructions associated with that region.

The systems and techniques described here need not be limited to the specific details described above. For example, data stored in tools/information file 14 may represent addresses or "links" to other data or addresses stored on workplace system 10, or external to system 10.

Other embodiments are within the scope of the following claims.

What is claimed is:

1. A method comprising:
    storing a plurality of role data entries on a storage device coupled to a computer system, a role data entry corresponding to an assigned role of at least one of a plurality of individuals, the assigned role corresponding to an enterprise with which the individual is associated, and the assigned role corresponding to a set of resources accessible through the computer system;
    receiving at the computer a resource request from one of the individuals, the resource request indicating a requested resource;
    determining based on an assignment of the assigned role to the requesting individual whether the requested resource is included in the set of accessible resources corresponding to the assigned role of the requesting individual, the assignment of the assigned role being defined prior to receiving the resource request; and
    selectively permitting access to the requested resource if the resource is determined to be in the set of resources corresponding to the assigned role of the requesting individual; and, wherein:
        the requested resource is a shared resource from a common set of resources that are accessible to other individuals;
        access to the shared resource for the other individuals is based on an assignment of a second role to the other individuals, the second role being the assigned role of the requesting individual or another role;
        a first combination of shared resources accessible to the requesting individual is the same as a second combination of shared resources accessible to another individual having same assigned roles; and
        the first and second combination are the same due to selective permission of access being based on assignments of roles, and the assigned roles of the requesting individual and the another individual being the same.

2. The method of claim 1, wherein the requested resource corresponds to at least one of an item of information that is displayable on a window of a display device, an application executable on a user device, and an address link to information stored on a second computer.

3. The method of claim 1, further comprising:
    storing at least one of the accessible resources on the storage device coupled to the computer.

4. The method of claim 1, wherein at least one item of the accessible resources corresponds to a link address, the link address corresponding to an item of information stored on a second computer.

5. The method of claim 1, further comprising:
    displaying the requested resource on a display window of a user device.

6. The method of claim 5, further comprising:
    detecting a selection of an active region on the display window prior to sending the request for the requested resource, wherein the request corresponds to the detected selection.

7. The method of claim 6, further comprising:
    displaying the requested resource on the display window.

8. The method of claim 6, further comprising:
    displaying the requested resource on an associated window on the display device.

9. The method of claim 5, further comprising:
    relating a first object displayed on the display window to a second object displayed on the display window, wherein relating the first object to the second object causes a further display of information on the display window.

10. The method of claim 9, wherein at least one of the first object and second object are icons displayable on a display device of a computer.

11. The method of claim 5, wherein displaying the requested resource on the display window comprises:
    executing a browser application, the browser application controlling a role-based portal window displayable on a user device.

12. The method of claim 1, further comprising:
    assigning a common set of information to a second plurality of assigned roles, each of the second assigned roles corresponding to at least one individual in the plurality of individuals.

13. The method of claim 12, further comprising:
    detecting a change to an item in the common set of information; and
    sending a message to at least one other individual to indicate the detected change.

14. The method of claim 13, further comprising:
    displaying an updated display window that reflects the detected change to the item.

15. The method of claim 12, wherein access to the common set of information is controllable by a first individual assigned a controlling role.

16. The method of claim 12, further comprising:
accessing the common set of information from a plurality of user devices, each user device having a role-based portal window.

17. The method of claim 12, further comprising:
controlling access by the plurality of individuals to the common set of information by a first individual.

18. The method of claim 17, wherein the first individual has access control to the common set of information and the first individual is an employee of a business, and
wherein a second one of the plurality of individuals is a non-employee.

19. The method of claim 1, wherein accessing a subset of the resources comprises displaying a customized display window including at least one item of the subset of resources accessible to the individual, the method further comprising:
accessing the subset of resources, the subset of resources comprising the requested resource.

20. The method of claim 19, wherein the customized display window corresponds to a previously customized display window.

21. The method of claim 1, further comprising:
accessing the requested resource by logging on to the computer system with a unique identifier corresponding to a one of the plurality of individuals.

22. The method of claim 21, wherein logging on to the computer system comprises:
executing a single sign on application.

23. A system comprising:
a first computer coupled to a storage device, the storage device holding a plurality of role data entries, a role data entry corresponding to an assigned role of at least one of a plurality of individuals, the assigned role corresponding to a subset of information accessible through the first computer;
a user device coupled to communicate with the first computer, the user device having a display device displaying a role-based portal window, the role-based portal window usable to send a request to the first computer for an item of information; and
a role-based filter application executable by the first computer to determine based on an assignment of the assigned role to a requesting individual whether the item of information requested is included in the subset of accessible information corresponding to the assigned role of the requesting individual, the assignment of the assigned role being defined prior to receiving the request from the requesting individual; wherein:
the requested item of information is a shared resource from a common set of resources that are accessible to other individuals;
access to the shared resource for the other individuals is based on assignment of a second role to the other individuals, the second role being the assigned role of the requesting individual or another role;
a first combination of shared resources accessible to the requesting individual is the same as a second combination of shared resources accessible to another individual having same one or more assigned roles; and
the first and second combination are the same due to selective permission of access being based on assignments of roles, and the assigned one or more roles of the requesting individual and the another individual being the same.

24. The system of claim 23, further comprising:
a second computer coupled to communicate with the first computer and the user device, wherein at least one item of the subset of information accessible through the first computer corresponds to a link address, the link address corresponding to an item of information stored on the second computer.

25. The system of claim 23, wherein a common set of information is assigned to a plurality of assigned roles, each of the roles corresponding to at least one individual, and
the role-based filter application is executable to detect a change to an item in the common set of information by a first one of the plurality of individuals and send a message to at least one user device corresponding to a second of the plurality of individuals to indicate the detected change.

26. A method of facilitating access to resources in a collaborative environment, the method comprising:
receiving a request from a user to access a resource associated with the collaborative environment, the requested resource being a shared resource from a common set of resources that are accessible to other users, and access to the shared resource for the other users being based on assignment of a first role to the other users, the first role being the same or different from a second role assigned to the requesting user;
determining an enterprise affiliation of the requesting user, the enterprise affiliation being defined prior to receiving the resource request; and
selectively providing access to the requested resource based on the determination of the enterprise affiliation and assignment of roles; wherein:
a first combination of shared resources accessible to the requesting user is the same as a second combination of shared resources accessible to another user having a same one or more assigned roles; and the first and second combination are the same due to selective provision of access being based on assignment of roles, and the assigned roles of the requesting user and the another user being the same.

27. The method of claim 26, wherein the resource is at least one of a tool, application, file, file link and document.

28. The method of claim 26, further comprising:
displaying the requested resource on a display window of a user device.

29. The method of claim 26, further comprising:
assigning a common set of resources to a plurality of assigned roles, each role corresponding to at least one individual.

30. The method of claim 29, further comprising:
controlling access to the common set of resources by a first individual assigned a controlling role.

31. The method of claim 30, wherein the first individual is an employee of a business, and
a second one of the plurality of individuals is a non-employee.

32. The method of claim 29, further comprising:
accessing the set of resources from a plurality of user devices, each user device having a role-based portal window.

* * * * *